(12) United States Patent
Nakahara et al.

(10) Patent No.: US 6,977,288 B2
(45) Date of Patent: Dec. 20, 2005

(54) PRODUCTION PROCESS FOR VINYL CHLORIDE POLYMER

(75) Inventors: Yoshinori Nakahara, Kashima-gun (JP); Masatsugu Takano, Tsuchiura (JP); Yasuhiro Takahashi, Kashima-gun (JP); Tadashi Amano, Kashima-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 45 days.

(21) Appl. No.: 10/834,978

(22) Filed: Apr. 30, 2004

(65) Prior Publication Data

US 2005/0027088 A1 Feb. 3, 2005

(30) Foreign Application Priority Data

Aug. 1, 2003 (JP) ............................. 2003-205369
Aug. 1, 2003 (JP) ............................. 2003-205370
Mar. 5, 2004 (JP) ............................. 2004-061562

(51) Int. Cl.$^7$ ............................................. C08F 14/06
(52) U.S. Cl. .................. 526/344; 526/344.1; 526/209; 422/21
(58) Field of Search ........................... 526/344, 344.1, 526/209; 422/21

(56) References Cited

FOREIGN PATENT DOCUMENTS

JP            07-025909       *    1/1995

OTHER PUBLICATIONS

Patent Abstracts of Japan, JP 07-025909, Jan. 27, 1995.

* cited by examiner

Primary Examiner—William K. Cheung
(74) Attorney, Agent, or Firm—Oblon, Spivak, McClelland, Maier & Neustadt, P.C.

(57) ABSTRACT

A production process for a vinyl chloride polymer is proposed in which either vinyl chloride, or a monomer mixture comprising vinyl chloride, is polymerized in an aqueous medium inside a polymerization vessel, while heat removal is conducted using a reflux condenser. In this process, the liquid level of the contents inside the polymerization vessel is monitored using an electric wave liquid level gauge, which is disposed on the polymerization vessel and radiates microwaves with a frequency of 4 to 20 GHz. The operating efficiency of the reflux condenser can be improved, and the quantity of heat removed by the reflux condenser can be increased. Furthermore, the time required to complete the process, including the raw material addition step and/or the washing step conducted following completion of the polymerization, can be shortened.

8 Claims, 3 Drawing Sheets

(a)  (b)

PRODUCTION PROCESS FOR VINYL CHLORIDE POLYMER

BACKGROUND OF THE INVENTION

1. Field of the Invention

The present invention relates to a production process for a vinyl chloride polymer in which by using an electric wave liquid level gauge for continuously detecting and measuring the liquid level of the polymerization vessel contents, not only during the polymerization step, but also during the raw material addition step and/or the polymer dispersion extraction and washing steps, the state inside the polymerization vessel can be accurately ascertained at all times.

Furthermore, the present invention also relates to a production process for a vinyl chloride polymer in which by also detecting and measuring the liquid level of the polymerization vessel contents during the raw material addition step and/or the polymer dispersion extraction and washing steps, the productivity can be improved with good retention of the product quality.

In addition, the present invention also relates to a production process for a vinyl chloride polymer in which the liquid level of the polymerization vessel contents is observed using the electric wave liquid level gauge, and foaming caused by operation of the reflux condenser is suppressed by addition of an antifoaming agent.

2. Description of the Prior Art

A multitude of production processes for vinyl chloride polymers capable of improving the productivity with no loss in product quality have been proposed, and in some cases adopted, and these processes have used a variety of different approaches. Vinyl chloride polymers are normally produced by batch polymerization. Accordingly, one method of improving the productivity is to shorten the time required for an entire single batch, and particularly the time required for the polymerization reaction step, thereby increasing the number of batches that can be completed within a predetermined unit of time. Furthermore, improvements in productivity can also be achieved by increasing the scale of the polymerization vessel.

Consequently, a reflux condenser is typically used, in addition to a cooling jacket (and where necessary a cooling baffle and/or a cooling coil), to enable the polymerization reaction heat to be removed as efficiently as possible. Removal of heat using a reflux condenser is more economic than heat removal using a cooling jacket, a cooling baffle or a cooling coil, meaning there is a tendency to try and increase the proportion of heat removed by the reflux condenser relative to the total heat removal quantity.

Heat removal by the reflux condenser occurs by condensation of the vaporized monomer. As a result, the pressure of the gas phase within the polymerization vessel decreases, causing an unavoidable foaming phenomenon at the surface of the liquid phase. If the quantity of heat removed by the reflux condenser is increased beyond a certain level, then the generation of scale on the internal walls of the polymerization vessel at the gas-liquid interface becomes increasingly likely, and polymer particles may erupt up inside the reflux condenser with the foam and adhere to the surface of the reflux condenser. In addition, scale generated in this manner can then become mixed with the product during the next polymerization batch, causing an increase in fish eyes. Resolving these problems continues to be the focus of ongoing investigations.

For example, a process has been proposed in which the quantity of foaming is suppressed by using a foam sensor installed within the gas phase portion of the polymerization vessel to detect when the foam at the surface of the liquid phase has reached a predetermined level, and then adding an antifoaming agent at that point (see patent reference 1). In this process, the electrostatic volume type sensor used as the foam sensor is a contact type sensor, meaning the measurement accuracy of the sensor deteriorates if polymer particles become adhered to the sensor section. Furthermore, a multitude of different materials are now being produced as vinyl chloride polymers, and in this process, the optimum level of foaming at which to add the antifoaming agent differs for each material. However, in the process described above the position of the sensor is fixed, meaning only a specific level of foam can be measured. Accordingly, the above process is only capable of detecting the optimum level of foam for one group of polymers.

Furthermore, another process has been proposed in which scale generation and the like is inhibited by controlling the gas-liquid interface within a predetermined range (see patent reference 2). In this process, a polymerization vessel equipped with a liquid level gauge for continuously measuring the liquid level inside the polymerization vessel is used, and the temperature or the flow rate of the cooling water supplied to the reflux condenser is altered in accordance with the liquid level measured by the liquid level gauge. As a result, the quantity of monomer that is refluxed by the reflux condenser can be raised or lowered, enabling the gas-liquid interface to be controlled in a state of continuous surface agitation within a predetermined range, without ever settling. The drawbacks of this process are that the absolute quantity of heat removed is low, and the fact that it is difficult to maximize the heat removal capability of the reflux condenser.

In addition, another process has been proposed in which the heat removal capability of the reflux condenser can be effectively utilized without causing a deterioration in product quality, by selecting the most suitable antifoaming agent and then adding this antifoaming agent at a specific time during operation of the reflux condenser (see patent reference 3). However, this process suffers from the same drawbacks as the process of the patent reference 1. Furthermore in this process, the addition quantity and addition time for the antifoaming agent are determined by inspecting the position of polymer particles adhered to the inside of the vessel following completion of a polymerization batch, and consequently the process is extremely inefficient.

If a non-contact type liquid level gauge is used, then the following types of problems can arise. In order to improve the measurement accuracy, non-contact type liquid level gauges are usually installed with the tip of the sensor protruding into the polymerization vessel from a position on the side wall in the upper region of the polymerization vessel. With this type of configuration, if the quantity of heat removed by the reflux condenser increases too far, then scale can adhere to the tip of the sensor. In order to ensure that foam does not adhere to the sensor tip, the maximum quantity of heat that can be removed by the reflux condenser must be restricted, thus enabling the height of the foam layer generated during the polymerization reaction to be suppressed. As a result, the maximum heat removal capability of the reflux condenser cannot be utilized. In order to prevent scale adhesion to the sensor tip, an indentation can be formed in the side wall of the upper region of the polymerization vessel, and the sensor tip then housed inside this indentation, but this causes the sensor to also pick up microwave reflections off the side walls of the indentation. These reflected microwaves from the side walls cause errors in the measurement of the liquid level, increasing the danger of a marked deterioration in the accuracy of the liquid level measurements.

Patent Reference 1
Japanese Laid-open publication (kokai) No. Hei 4-130103
Patent Reference 2
Japanese Laid-open publication (kokai) No. Hei 7-25909
Patent Reference 3
Japanese Laid-open publication (kokai) No. Hei 9-169805

Batch production of a vinyl chloride polymer is conducted by repeating a batch process comprising essentially the steps of filling the polymerization vessel with an aqueous medium and adding the raw materials such as monomers and the like, conducting the polymerization reaction, extracting the polymer-containing dispersion following completion of the polymerization reaction, and washing the inside surfaces of the polymerization vessel. Managing and controlling the time required for the steps performed prior to and following the polymerization reaction is also an important factor in improving the overall productivity.

Normally, the quantity of the monomer such as the vinyl chloride monomer added is measured by a flow meter installed within the feed line, and is controlled so as to ensure a predetermined constant quantity. However, this flow meter measures only monomer such as the vinyl chloride monomer supplied in a liquid state, and consequently a cavitation phenomenon inside the pump used for feeding and supplying the monomer can cause trouble. Namely, if a portion of the monomer gasifies, then that quantity is not counted by the flow meter, meaning an excessive quantity of the monomer may end up being introduced into the polymerization vessel. In recent years, many feed pumps are being used at levels exceeding their specifications in order to shorten the time required to add the monomer, and this has resulted in a higher frequency of the above type of trouble. Furthermore, after extended usage, the accuracy of flow meters tends to deteriorate, meaning the quantity of the monomer can no longer be accurately measured. The resulting errors in the monomer quantity can have a significant effect on the quality of a product of specific design specifications. In addition, control of the supply of the aqueous medium suffers from similar problems, although the size of the effect may differ. In a conventional production process, detecting those problems which arise from the above types of phenomena caused by the feed pump is extremely difficult, and determining the actual cause of a deterioration in product quality requires considerable investment in terms of time and cost.

Furthermore, shortening the time required for the steps following the completion of the polymerization reaction is also important. Following extraction of the dispersion containing the product polymer from the polymerization vessel, the internal surfaces of the polymerization vessel are washed. Normally the start time for this washing step is determined by measuring the load on the stirring device inside the polymerization vessel. As the liquid level of the reaction mixture inside the polymerization vessel falls the load on the stirring device also falls, and when this load falls below a certain value, operation of the stirring device is halted and the aforementioned washing step is started. However, because the viscosity of the reaction mixture inside the polymerization vessel varies depending on the specifications and the type of the polymer being produced, using the load on the stirring device to determine when the liquid level of the reaction mixture inside the polymerization vessel has fallen below a certain level can be difficult. In other words, even if the washing start time is set on the basis of the load on the stirring device, the height of the residual reaction mixture liquid inside the polymerization vessel may vary. As a result, determining the most appropriate washing start time can be problematic, and in order to ensure that extraction of the reaction mixture has been completed satisfactorily, normally a longer time than is actually necessary is allowed for this extraction, which is not ideal in terms of productivity.

SUMMARY OF THE INVENTION

An object of the present invention is to provide a production process for a vinyl chloride polymer in which a liquid level gauge is used for accurately determining the liquid level of the contents inside a polymerization vessel, not only during the polymerization step, but also during steps outside the actual polymerization step such as the steps for adding the raw materials such as the monomer, recovering any unreacted monomer, extracting the polymer slurry, and washing the inside of the polymerization vessel.

Another object of the present invention is to provide a production process for a vinyl chloride polymer in which by accurately detecting and measuring the liquid level not only during the polymerization reaction step, but also during the production steps prior to and following the polymerization, the productivity can be improved markedly by shortening the times required for each step in the vinyl chloride polymer production.

Yet another object of the present invention is to provide a production process for a vinyl chloride polymer in which the maximum heat removal capability of the reflux condenser can be utilized by suppressing foaming through the addition of an antifoaming agent to the polymerization vessel contents when the liquid level has risen to a certain level as a result of foaming.

As a result of intensive investigations, the inventors of the present invention discovered that employing a specific liquid level gauge, and utilizing this liquid level gauge not only during the polymerization reaction step, but also in the steps performed prior to and following the polymerization reaction, was very effective in accurately determining and controlling the liquid level of the polymerization vessel contents.

In addition, they also discovered that the maximum heat removal capability of the reflux condenser can be utilized by suppressing foaming through the addition of an antifoaming agent to the polymerization vessel contents when the liquid level has risen to a certain level as a result of foaming.

Based on these discoveries, the inventors of the present invention were able to complete the present invention.

In other words, the present invention provides a production process for a vinyl chloride polymer in which either vinyl chloride, or a mixture of vinyl chloride and another copolymerizable monomer, is polymerized in an aqueous medium inside a polymerization vessel equipped with a reflux condenser to generate the vinyl chloride polymer, wherein the liquid level of the polymerization vessel contents is detected using an electric wave liquid level gauge, which is disposed on the polymerization vessel and radiates microwaves with a frequency of 4 to 20 GHz.

In a preferred embodiment of the above process, the present invention provides a production process for a vinyl chloride polymer wherein the aforementioned liquid level gauge is used for detecting and measuring the liquid level of the polymerization vessel contents during the polymerization reaction step, and also during the raw material addition step performed prior to commencement of the polymerization reaction, and/or the polymer dispersion extraction and washing steps performed following completion of the polymerization reaction.

In addition, in another preferred embodiment of the above process, the present invention provides a production process for a vinyl chloride polymer wherein at least for the period during which heat removal is conducted using the reflux condenser, the liquid level of the liquid contents inside the polymerization vessel is monitored using the electric wave liquid level gauge, and if the polymerization conversion rate is within a range from 30 to 60% and the liquid level has risen above a predetermined height, an antifoaming agent is added to the liquid contents.

DETAILED DESCRIPTION OF THE PREFERRED EMBODIMENTS

As follows is a more detailed description of the present invention. In this description, the term "liquid level" refers to either the surface of the liquid contents inside the polymerization vessel, or in those cases where a foam layer is formed on top of the liquid contents, to the surface of the foam layer.

-Polymerization Reaction Apparatus-

A polymerization vessel used in the examples of the process of the present invention comprises a reflux condenser as a cooling device. Furthermore, the vessel also comprises an electric wave liquid level gauge as a device for monitoring the liquid level. The polymerization vessel typically also comprises a jacket for heating and cooling, and although not essential, preferably also comprises a baffle or a coil or the like with cooling capabilities. Furthermore, the polymerization vessel may also comprise an external heat exchange device in which the mixed slurry inside the polymerization vessel is extracted with a pump, passed through a heat exchanger disposed outside the polymerization vessel, and is then returned to the polymerization vessel. There are no particular restrictions on the shape of the polymerization vessel, although a polymerization vessel with a straight circular cylindrical body section is preferred.

Figure 1:
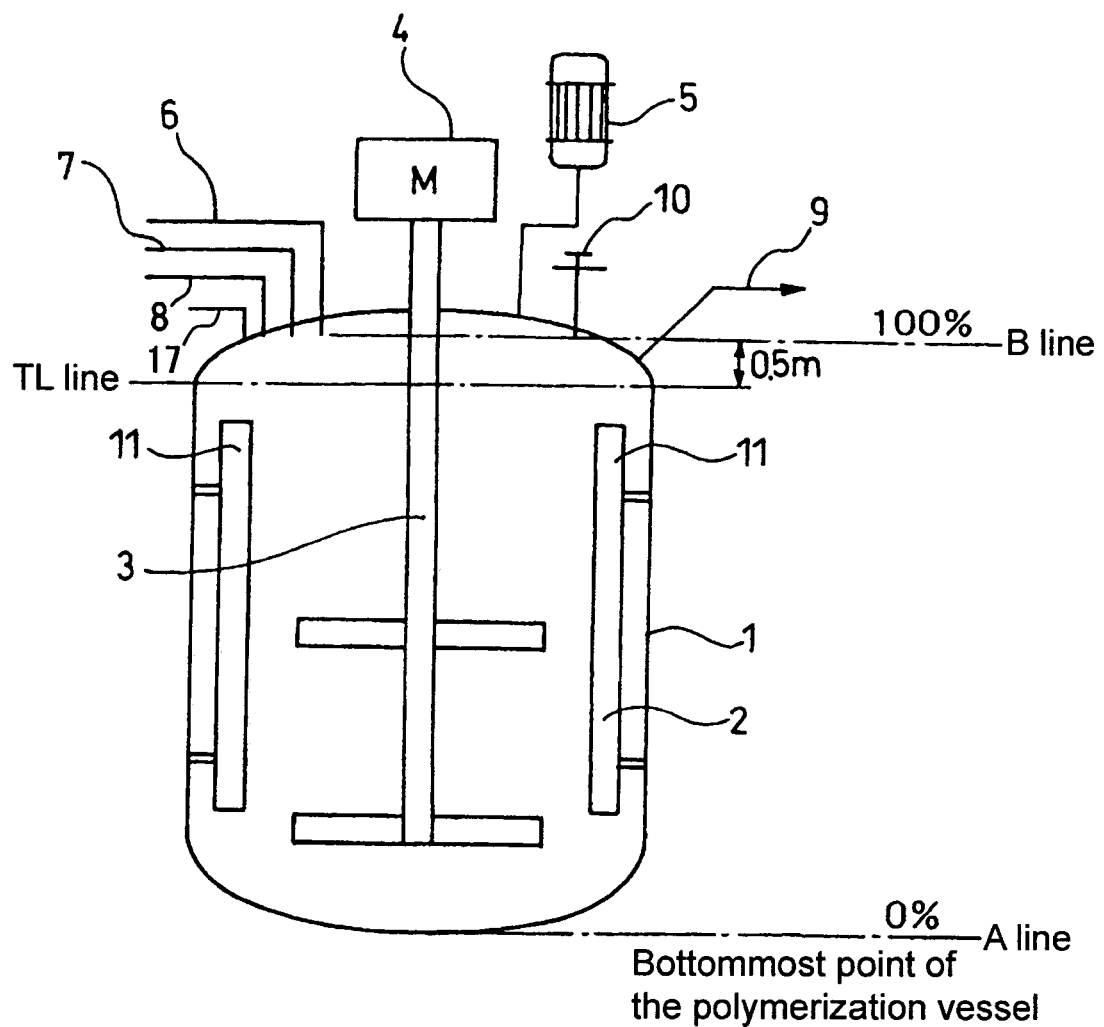
FIG. 1 is a schematic illustration showing one example of a polymerization vessel used in a process of the present invention.

One example of a polymerization reaction apparatus used in a process of the present invention is shown in FIG. 1. A polymerization vessel 1 is enclosed inside a heating and cooling jacket (not shown in the figure), and a coolant such as cooling water is circulated though this heating and cooling jacket via a line not shown in the figure. Furthermore, where necessary a cooling baffle 11 and/or a cooling coil (not shown in the figure) may also be provided inside the polymerization vessel 1. Furthermore, a reflux condenser 5 is provided at the top of the polymerization vessel 1, and a coolant such as cooling water is also circulated through this reflux condenser 5 via a line not shown in the figure. The reflux condenser 5 condenses, liquefies, and refluxes monomer vapor generated inside the polymerization vessel 1.

An aqueous medium supply line 6 for ion exchange water or the like, a polymerization initiator supply line 7, a monomer supply line 8, a recovery line 9 for recovering unreacted monomer following completion of the polymerization reaction, and a line 17 for adding an antifoaming agent to the polymerization vessel contents are each connected to the polymerization vessel 1. Furthermore, a stirrer 3 equipped with a paddle blade for stirring the contents (not shown in the figure) inside the polymerization vessel 1 is rotated by a drive motor 4 fitted to the polymerization vessel 1. In the example shown in the figure, a liquid level gauge 10 is disposed in the upper section of the polymerization vessel 1.

The material for the internal surface of the polymerization vessel, the baffle, the paddle blade, and the shaft and the like used in this polymerization apparatus of the present invention is preferably a stainless steel such as a high chromium content, high purity, ferrite stainless steel, two-phase stainless steel or austenite stainless steel.

[Liquid Level Gauge]

In the present invention, an electric wave liquid level gauge is used due to the advantages it offers in terms of enabling continuous monitoring of the liquid level inside the polymerization vessel, being a non-contact type gauge, and being unrestricted by the pressure inside the polymerization vessel.

Non-contact type liquid level gauges are usually installed with the tip of the sensor protruding into the polymerization vessel from a position on the upper inside surface of the polymerization vessel in order to improve the measurement accuracy of the gauge, but this can lead to scale adhesion to the tip of the sensor. Furthermore, in order to ensure that foam does not adhere to the tip of the sensor, the maximum quantity of heat that can be removed by the reflux condenser must be restricted to enable the height of the foam layer generated during the polymerization reaction step to be suppressed. However as a result, the maximum heat removal capability of the reflux condenser cannot be utilized. The above problems of scale adhesion and restriction of the quantity of heat that can be removed by the reflux condenser can be resolved by housing the sensor tip in an indentation formed in the upper region of the polymerization vessel. However the reflected microwaves entering the sensor tend to get mixed with extraneous noise, causing a deterioration in the accuracy of the liquid level measurements.

In the case of the electric wave liquid level gauge used in a process of the present invention, the sensor tip is preferably fitted with a horn antenna in order to ensure reliable reception of the microwaves that are reflected off the liquid surface off the polymerization vessel contents, which represent the measurement target. In order to improve the measurement accuracy, as large a horn antenna as possible is installed, although the size of the antenna varies depending on the installation conditions. The horn antenna and the main body of the sensor are preferably linked together with a waveguide, and by appropriately adjusting the length of this waveguide, the horn antenna can be precisely positioned in the most favorable location. Furthermore, by employing a waveguide, the installation angle of the waveguide can be inclined relative to the liquid surface, with no particular restrictions on this angle of inclination, provided the opening at the tip of the horn antenna is positioned parallel with the liquid surface. The opening at the tip of the horn antenna which detects the microwaves need only protrude a very small amount into the polymerization vessel, and the antenna does not suffer from problems such as deterioration in the measurement accuracy, restrictions on the height of the foam layer during the polymerization reaction, restrictions on the heat removal capabilities of the reflux condenser, or adhesion of scale to the sensor, and can be used for extended periods with minimal maintenance. The microwaves are emitted and received at the bottom of the sensor.

Figure 2:
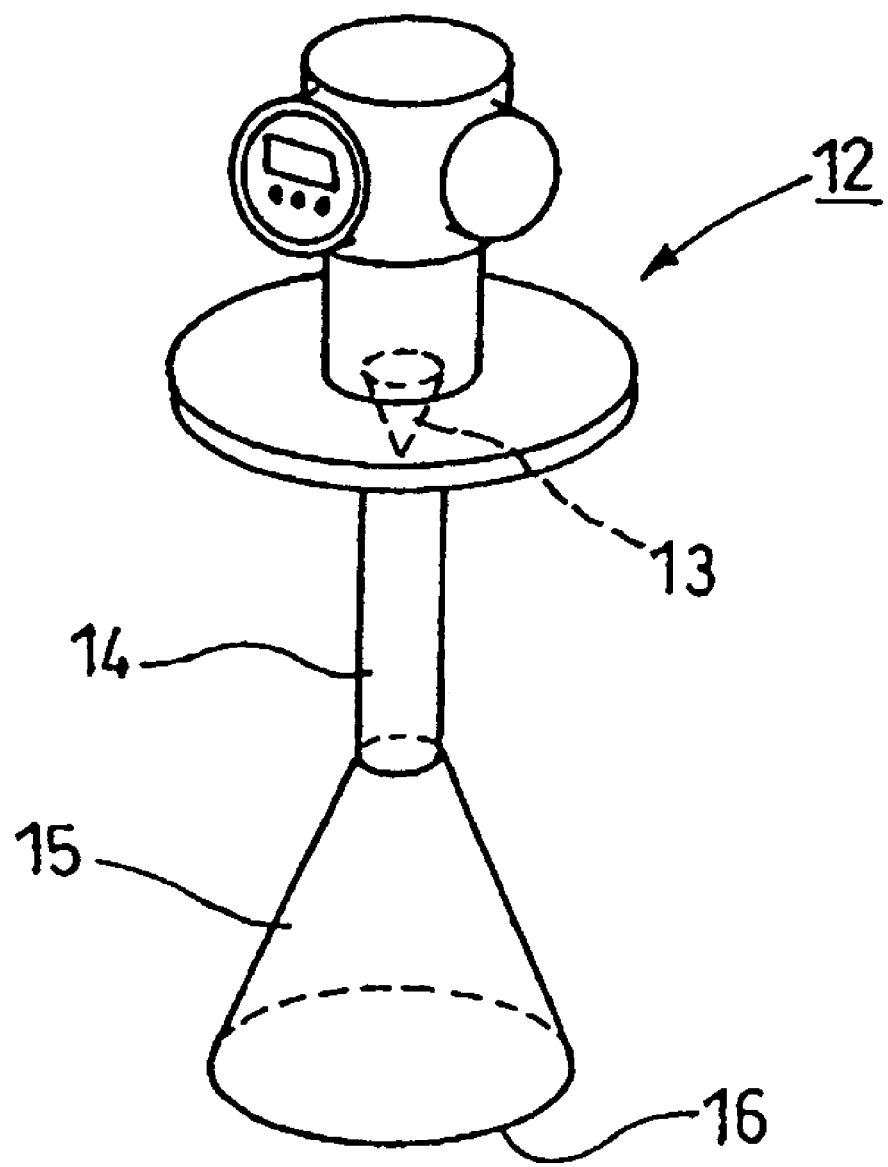
FIG. 2 is a schematic illustration of an electric wave liquid level gauge used in examples and comparative examples of the present invention.
Figure 3:
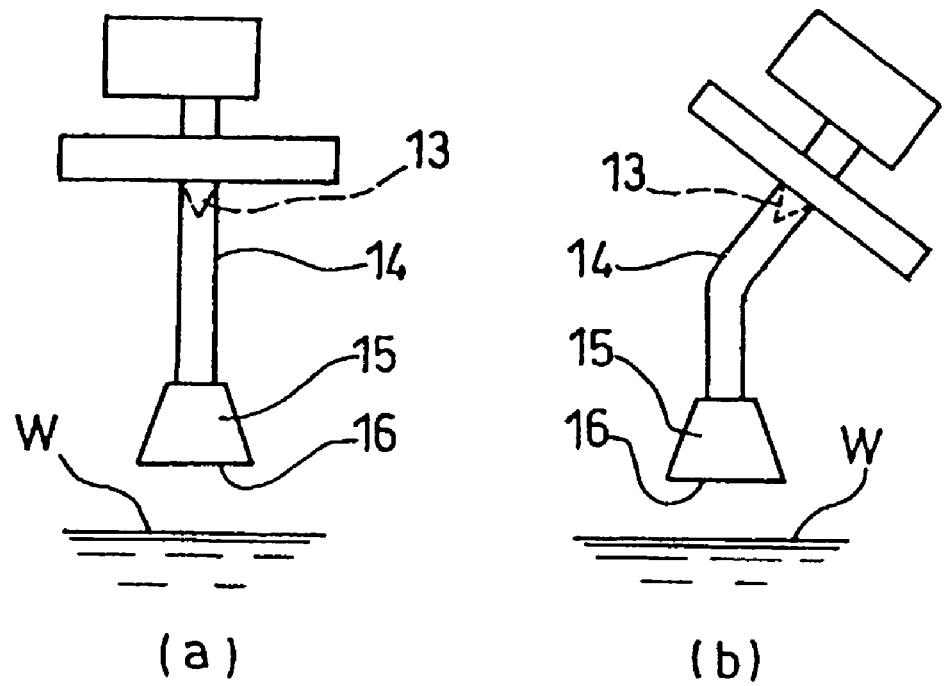
FIG. 3 is a drawing showing applied examples of the electric wave liquid level gauge, wherein (a) shows a gauge in which the waveguide is straight, and (b) a gauge in which the waveguide is bent.

A schematic illustration of one example of the electric wave liquid level gauge described above is shown in FIG. 2. The electric wave liquid level gauge 12 is equipped with a microwave transceiver 13, a waveguide 14 and a horn antenna 15. Applied examples of the shape of the electric wave liquid level gauge are shown in FIG. 3. Provided the opening 16 at the tip of the horn antenna is positioned parallel with the liquid surface W, as is the case in both examples shown in FIGS. 3(a) and (b), there are no particular restrictions on the installation angle of the waveguide. The waveguide may be straight as shown in FIG. 3(a), or bent as shown in FIG. 3(b).

Provided the liquid level is able to be monitored, the electric wave liquid level gauge may be installed in any position on the polymerization vessel. Accordingly, the gauge can be positioned in the most appropriate position for the particular polymerization conditions being employed.

The electric wave liquid level gauge used in the process of the present invention must radiate microwaves with a frequency within a range from 4 to 20 GHz, and preferably from 5 to 10 GHz. Microwaves exceeding 20 GHz but less than 30 GHz can be used with comparatively gentle liquid level variations such as those cause by stirring, but when attempting to detect the liquid level during the type of vigorous foaming that can occur during the polymerization reaction step, the reflected waves are generated as irregular reflections, making it difficult to detect the liquid level. Furthermore, if microwaves of a frequency exceeding 30 GHz are used, then detection of the liquid level during either liquid surface fluctuations caused by stirring or vigorous foaming is virtually impossible. In contrast, if microwaves of a frequency less than 4 GHz are used, then the accuracy of the measurements decreases, making accurate detection and measurement of the liquid level impossible.

In the present invention, by using an electric wave liquid level gauge that radiates microwaves with a frequency that falls within the range specified above, fluctuations in the liquid level of the polymerization vessel contents can be determined accurately and continuously during all the steps, including the polymerization step and the other steps outside the polymerization reaction.

[Monitoring of the Liquid Level Using the Electric Wave Liquid Level Gauge]

Another feature of the present invention is the monitoring of the liquid level of the liquid contents inside a polymerization vessel using an electric wave liquid level gauge which is fitted to the polymerization vessel and radiates microwaves with a frequency of 4 to 20 GHz.

In the present invention, by using a liquid level gauge described above, not only can the liquid level be detected accurately during use of the reflux condenser or gas exhausting in the polymerization reaction step, but the quantity of raw material added during the raw material addition step can be detected on the basis of the actual quantity of liquid inside the polymerization vessel, and consequently the process control computer is able to activate an overfill prevention operation before the quantity of raw material exceeds the desired level, thus enabling an improvement from the safety perspective. In a similar manner, in the case of underfill, defects in the addition step can be identified precisely, enabling further improvements in quality control.

Furthermore, the start time for washing the inside of the polymerization vessel following completion of the polymerization reaction has conventionally been determined solely on the basis of the load on the stirrer during extraction of the polymer dispersion, but by determining in advance the optimum liquid level at which to begin the washing process, and then determining the actual quantity of liquid within the polymerization vessel using the liquid level gauge, washing can be commenced at the most appropriate time, meaning unnecessary downtime can be avoided.

In order to reduce the time required for the washing of the polymerization vessel as much as possible, the washing is typically commenced prior to the complete removal of the polymer slurry from the polymerization vessel, and the water used in the cleaning process is then transferred to the blowdown tank together with the product polymer slurry.

Because the monitoring described above can be conducted accurately and continuously, the use of the electric wave liquid level gauge enables both the most appropriate time for addition of an antifoaming agent and the most appropriate addition quantity to be determined on the basis of the liquid level fluctuations caused by variations in the quantity of heat removed by the reflux condenser. Accordingly, the heat removal capability of the reflux condenser can be utilized at maximum efficiency.

The period for which the liquid level is monitored using the electric wave liquid level gauge must include at least the period during which heat removal is conducted using the reflux condenser. In other words, the monitoring of the liquid level may be started prior to commencement of heat removal using the reflux condenser, and may be continued after completion of heat removal using the reflux condenser.

There are no particular restrictions associated with the present invention, and the same conditions as those typically used in an aqueous suspension polymerization of either vinyl chloride monomer or a mixture comprising vinyl chloride monomer and another polymerizable monomer can be used.

[Monomer]

The monomer raw material used in the present invention is either vinyl chloride or a monomer mixture comprising vinyl chloride as the primary constituent. A monomer mixture comprising vinyl chloride as the primary constituent comprises at least 50% by weight of vinyl chloride, as well as another monomer which is copolymerizable with the vinyl chloride. Examples of other monomers which are copolymerizable with vinyl chloride include vinyl esters such as vinyl acetate and vinyl propionate; acrylate esters such as methyl acrylate and ethyl acrylate; methacrylate esters; olefins such as ethylene and propylene; as well as other monomers such as maleic anhydride, acrylonitrile, styrene and vinylidene chloride. These monomers may be used singularly, or in combinations of two or more monomers.

-Features of the Process of the Present Invention-

Heat Removal by the Reflux Condenser

A feature of the present invention is the removal of heat generated by the polymerization using an aforementioned reflux condenser.

In a suspension polymerization of vinyl chloride monomer or a monomer mixture thereof, typically an aqueous medium, a dispersant (a suspension agent), a polymerization initiator, and where necessary a variety of other additives, are combined in a polymerization vessel, and hot water is then circulated through the jacket until the temperature inside the polymerization vessel reaches a predetermined polymerization reaction temperature, thus initiating the polymerization reaction. Subsequently, the polymerization reaction is allowed to proceed at a predetermined reaction temperature by using cooling devices such as the reflux condenser to remove the polymerization reaction heat. When heat removal is performed using the reflux condenser, in order to prevent rapid variations in the temperature inside the polymerization vessel or the jacket temperature, and avoid any major effects on the foaming of the polymerization reaction mixture, normally the quantity of heat removed by the reflux condenser is increased gradually from the commencement of reflux condenser heat removal until a predetermined heat removal quantity is reached. In the process of the present invention, the polymerization reaction is normally conducted at a temperature of 20 to 80° C., and preferably at 35 to 75° C., and even more preferably at 45 to 70° C.

The temperature of the reaction mixture in the polymerization vessel is raised to a predetermined polymerization reaction temperature, and heat removal using the reflux condenser is only commenced once the temperature of the reaction mixture has reached that predetermined polymerization reaction temperature. Heat removal using the reflux condenser may be commenced either as soon as the temperature of the reaction mixture reaches the predetermined polymerization reaction temperature, or after a certain period of time has elapsed after reaching the predetermined polymerization reaction temperature. Heat removal using the reflux condenser is preferably started once the polymerization conversion rate has reached 10 to 15%. Furthermore, although heat removal using the reflux condenser may be continued until completion of the polymerization, it may also be stopped prior to completion of the reaction. Heat removal using the reflux condenser is preferably stopped at a polymerization conversion rate of 60 to 80%. In addition, heat removal using the reflux condenser is preferably conducted during the polymerization, for the polymerization conversion rate period between 10 and 80%, and even more preferably for the polymerization conversion rate period between 15 and 70%.

[Polymerization Initiator]

There are no particular restrictions on the polymerization initiator used in a process of the present invention, and the types of initiators used in conventional vinyl chloride polymer production are suitable. Specific examples of these polymerization initiators include peroxycarbonate compounds such as diisopropyl peroxydicarbonate, di-2-ethylhexyl peroxydicarbonate and diethoxyethyl peroxydicarbonate; peroxy ester compounds such as t-butyl peroxypivalate, t-hexyl peroxypivalate, t-butyl peroxyneodecanoate and α-cumyl peroxyneodecanoate; peroxides such as acetylcyclohexylsulfonyl peroxide, 2,4,4-trimethylpentyl-2-peroxyphenoxy acetate and 3,5,5-trimethylhexanoyl peroxide; azo compounds such as azobis-2,4-dimethylvaleronitrile and azobis(4-methoxy-2,4-dimethylvaleronitrile); as well as potassium persulfate, ammonium persulfate and hydrogen peroxide and the like. These polymerization initiators may be used singularly, or in combinations of two or more different initiators.

The quantity added of the polymerization initiator is typically within a range from 0.01 to 1 part by mass, and preferably from 0.03 to 0.2 parts by mass, per 100 parts by mass of the monomer or monomer mixture. The polymerization initiator can be added using conventional methods.

[Polymerization Completion]

In the present invention, the completion of the polymerization is the point at which the polymerization reaction is halted by addition to the polymerization reaction mixture of a sufficient quantity of a polymerization inhibitor (a material with polymerization inhibiting properties) to halt the polymerization reaction. After this addition, the recovery of any unreacted monomer is usually commenced.

[Polymerization Inhibitor]

The polymerization inhibitor used in a process of the present invention can utilize those inhibitors typically used in vinyl chloride polymer production. Specific examples of suitable polymerization inhibitors include phenol based compounds such as 2-t-butylphenol, 2-aminophenol, 2,4-dimethyl-6-tert-butylphenol, 2,6-diisopropyl-p-cresol, n-octadecyl-3-(3,5-di-t-butyl-4-hydroxyphenyl)propionate, 3,5-di-t-butyl-4-hydroxytoluene, triethylene glycol-bis[3-(3-t-butyl-5-methyl-4-hydroxyphenyl)propionate], t-butylhydroxyanisole, t-butylhydroquinone, 4,4'-butylidenebis(3-methyl-6-t-butylphenol), 2,2'-methylene-bis(4-methyl-6-t-butylphenol), 2,2'-methylene-bis(4-ethyl-6-t-butylphenol), 2,6-di-t-butyl-4-methylphenol, 2,6-di-t-butyl-4-ethylphenol, 2,6-di-t-butyl-4-hydroxymethylphenol, 4,4'-methylenebis(2,6-di-t-butylphenol), 4,4'-thiobis( 6-t-butyl-m-cresol), and tetrakis[methylene-3-(3,5-di-t-butyl-4-hydroxyphenyl)propionate] methane; phosphorus compounds such as cyclic neopentane tetraylbis(octadecyl phosphite); sulfur compounds such as dilauryl thiodipropionate, dimyristyl thiodipropionate, distearyl thiodipropionate, alkali metal sulfates, alkali metal hydrogensulfites, and alkali metal thiosulfates; and nitrogen compounds such as N,N-diethylhydroxylamine and sodium nitrite. These polymerization inhibitors may be used singularly, or in combinations of two or more different compounds. Of the above compounds, from the viewpoints of limiting scale adhesion to the polymerization vessel and achieving good anti-initial discoloration for the product polymer, n-octadecyl-3-(3,5-di-t-butyl-4-hydroxyphenyl)propionate, 3,5-di-t-butyl-4-hydroxytoluene, triethylene glycol-bis[3-(3-t-butyl-5-methyl-4-hydroxyphenyl)propionate], 2,2'-methylene-bis( 4-ethyl-6-t-butylphenol), 4,4'-butylidenebis(3-methyl-6-t-butylphenol), t-butylhydroxyanisole, t-butylhydroquinone, and N,N-diethylhydroxylamine are preferred.

The quantity added of the polymerization inhibitor is typically within a range from 0.001 to 0.3 parts by mass, and preferably from 0.003 to 0.1 parts by mass, and even more preferably from 0.005 to 0.05 parts by mass, per 100 parts by mass of the monomer or monomer mixture. This polymerization inhibitor can be added using conventional methods.

[Addition of an Antifoaming Agent]

In a preferred embodiment of the present invention, an antifoaming agent is added to the liquid contents in the polymerization vessel to cause defoaming in those situations where the polymerization conversion rate is within a range from 30 to 60% and the level of the liquid contents has risen above a predetermined height.

The measured value for the liquid level obtained using the electric wave liquid level gauge described above is compared with a preset height, and if the measured liquid level exceeds the preset height then a quantity of the antifoaming agent is added. These operations can be performed manually, although they may also be automated using a computer or the like. The liquid level is preferably suppressed to a height lower than the bottom of the condenser, in order to prevent carry over into the condenser, and the preset liquid level should be set within this range.

Addition of the antifoaming agent is commenced on the basis of a signal indicating that the liquid level has exceeded the preset height described above. Following commencement of this addition, either a predetermined quantity of the antifoaming agent may be added over a predetermined time period, or alternatively the addition may be continued until the liquid level detected by the electric wave liquid level gauge has once again fallen below the preset height, at which point the addition is stopped. Addition is preferably initiated every time the liquid level exceeds the preset height. These operations can be easily automated by suitable programming. Addition of the antifoaming agent is typically conducted when the polymerization conversion rate is within a range from 30 to 60%, and preferably from 40 to 50%.

[Antifoaming Agent]

There are no particular restrictions on the antifoaming agent used in the present invention, provided it generates an adequate antifoaming effect. Copolymer polyethers represent one preferred example of antifoaming agents that can be used in the present invention. Specifically, copolymer polyethers with a weight average molecular weight of 1,500,000 to 2,000,000, and preferably from 1,700,000 to 2,000,000, and an ethylene oxide to propylene oxide molar ratio within a range from 78/22 to 82/18 can be used.

If the above molecular weight is less than 1,500,000, then the action of the copolymer polyether in reducing the surface tension of, and thereby destroying, foam that has generated in the polymerization system weakens. As a result, the antifoaming effect becomes inadequate, which requires an increase in the quantity added of the antifoaming agent. This in turn results in a deterioration in the quality of the product polymer. Furthermore, if the molecular weight exceeds 2,000,000, then the viscosity of the polymer slurry tends to increase, causing a reduction in the antifoaming effect.

The quantity added of the copolymer polyether described above is typically within a range from 0.001 to 0.008 parts by mass, and preferably from 0.003 to 0.008 parts by mass, per 100 parts by mass of the monomer or monomer mixture. If the quantity used of the copolymer polyether relative to the total quantity of monomer is less than 0.001 parts by mass, then the desired antifoaming effect cannot be generated. Furthermore, if the quantity exceeds 0.008 parts by mass, the viscosity of the polymer slurry increases, causing a reduction in the antifoaming effect.

The copolymer polyether is preferably added to the polymerization reaction system as an aqueous solution. The concentration of that aqueous solution is typically within a range from 0.1 to 10% by weight, and preferably from 0.5 to 3% by weight.

The antifoaming agent, for example the copolymer polyether aqueous solution described above, is preferably added when the polymerization conversion rate is within a range from 30 to 60% and the level of the liquid contents inside the polymerization vessel has risen above the preset height described above. In an even more preferred configuration, the antifoaming agent is added to the polymerization reaction system when the polymerization conversion rate is within a range from 40 to 50% and the above liquid level has risen above the preset height. Prior to the polymerization conversion rate reaching 30%, the formation of polymer particles is still unsatisfactory, and if the antifoaming agent is added at this point then it may have a deleterious effect on the particle size distribution. Furthermore if the antifoaming agent is added at this comparatively early stage in the polymerization reaction, then there is a danger that the antifoaming effect will not last until the latter stages of the polymerization, when surface foaming is at its most vigorous. In contrast, in the case of a polymerization reaction in which heat removal is performed using a reflux condenser, by the time the polymerization conversion rate has exceeded 60%, foaming of the polymer slurry has already progressed considerably. As a result, if the antifoaming agent is added to the polymerization reaction system at this point, then the antifoaming agent simply adheres to the foam, is unable to adequately mix with the entire reaction liquid, and is consequently less able to exhibit the required antifoaming effect. If an attempt is made to ensure adequate mixing of the antifoaming agent with the reaction liquid, then an additional operation for increasing the rotational speed of the stirrer inside the polymerization vessel must be introduced at this point.

Addition of the antifoaming agent can be conducted either intermittently or continuously. If the addition is conducted intermittently, then the gap between additions may be either regular or irregular. The decision as to whether to add the antifoaming agent intermittently or continuously can be made on the basis of the persistence of the antifoaming effect. The copolymer polyethers described above not only have minimal effect on the final product quality, but display superior persistence to other antifoaming agents, and consequently intermittent addition is possible.

-Other Conditions-

There are no particular restrictions on the other conditions associated with the process of the present invention, and the conditions employed in conventional aqueous suspension polymerization reactions of either vinyl chloride or a monomer mixture comprising vinyl chloride as the primary constituent can be used.

[Dispersant]

There are no particular restrictions on the dispersant used when polymerizing vinyl chloride or the like in an aqueous medium in accordance with a process of the present invention, and the types of dispersants used in conventional vinyl chloride polymer production are suitable. Specific examples of these types of dispersants include water soluble cellulose ethers such as methyl cellulose, hydroxyethyl cellulose, hydroxypropyl cellulose and hydroxypropylmethyl cellulose; water soluble polymers such as water soluble partially saponified polyvinyl alcohols, polyacrylates, polymethacrylates and gelatin; oil soluble emulsifiers such as sorbitan monolaurate, sorbitan trioleate, glycerin tristearate, and block copolymers of ethylene oxide and propylene oxide; and water soluble emulsifiers such as polyoxyethylene sorbitan monolaurate, polyoxyethylene glycerin oleate and sodium laurate. These dispersants may be used singularly, or in combinations of two or more different dispersants.

[Antioxidants]

There are no particular restrictions on the antioxidants used in the present invention, and the types of antioxidants typically used in conventional vinyl chloride polymer production are suitable. Specific examples of these antioxidants include phenol compounds such as 2,2-di(4'-hydroxyphenyl)propane, hydroquinone, p-methoxyphenol, t-butylhydroxyanisole, n-octadecyl-3-(3,5-di-t-butyl-4-hydroxyphenyl)propionate, t-butylhydroquinone, 2,5-di-t-butylhydroquinone, 4,4'-butylidene-bis(3-methyl-6-t- butylphenol), 3,5-di-t-butyl-4-hydroxytoluene, 2,2'-methylene-bis(4-ethyl-6-t-butylphenol), triethylene glycol-bis[3-(3-t-butyl-5-methyl-4-hydroxyphenyl)propionate], pentaerythrityl-tetrakis[3-(3,5-di-t-butyl-4-hydroxyphenyl) propionate], 2,6-di-t-butyl-4-sec-butylphenol, 2,6-di-t-butyl-4-methylphenol, t-butylcatechol, 4,4'-thiobis(6-t-butyl-m-cresol), tocopherol and nordihydroguaiaretic acid; semicarbazide derivatives such as semicarbazide, 1-acetylsemicarbazide, 1-chloroacetylsemicarbazide, 1-dichloroacetylsemicarbazide, 1-benzoylsemicarbazide and semicarbazone; thiocarbazide derivatives such as carbohydrazide, thiosemicarbazide and thiosemicarbazone; amine compounds such as phenylnaphthylamine, N,N'-diphenyl-p-phenylenediamine and 4,4'-bis(2,4-dimethylbenzyl)diphenylamine; nitro and nitroso compounds such as nitrosoanisole, N-nitrosodiphenylamine, nitroaniline and the aluminum salt of N-nitrosophenylhydroxylamine; phosphorus compounds such as triphenyl phosphite, diphenylisodecyl phosphite, phenyldiisodecyl phosphite, 4,4'-butylidene-bis(3-methyl-6-t-butylphenyl-di-tridecyl) phosphite, cyclic isopentane tetraylbis(octadecyl phosphite), tris(nonylphenyl) phosphite and tris(dinonylphenyl) phosphite; and sulfur compounds such as dilauryl thiodipropionate, dimyristyl thiodipropionate, distearyl thiodipropionate, dodecylmercaptan and 1,3-diphenyl-2-thiourea. These antioxidants can be used singularly, or in combinations of two or more compounds. Of the above compounds, from the viewpoints of achieving good anti-initial discoloration, and limiting scale adhesion to the polymerization vessel, 3,5-di-t-butyl-4-hydroxytoluene, triethylene glycol-bis[3-(3-t-butyl-5-methyl-4-hydroxyphenyl)propionate], t-butylhydroxyanisole, t-butylhydroquinone, 2,6-di-t-butyl-4-sec-butylphenol and n-octadecyl-3-(3,5-di-t-butyl-4-hydroxyphenyl)propionate are preferred.

[Scale Adhesion Prevention Agent]

Conventional materials can be used for the scale adhesion prevention agent used in the present invention, and suitable examples include self-condensation products of polyhydric phenols and polyhydric naphthols; condensation products of 1-naphthol and formaldehyde; condensation products of a phenol compound and an aldehyde compound; mixed solutions of a quinone-amine compound and an organic silica sol; sulfide compounds of naphthols; mixtures and/or reaction products of an electron donating dye and an arylsulfonic acid; phenothiazine derivatives; quinone compounds and/or reduction products thereof; reaction products of a ketone resin and a phenolic compound; dyes, pigments, aromatic compounds containing at least 5 conjugated π bonds, and heterocyclic compounds containing at least 5 conjugated π bonds; polyaromatic amines; salts of a cationic compound and an anionic compound; reaction products of a polyvinyl alcohol and aminobenzoic acid; and initial condensation products of a phenol and an aldehyde. There are no particular restrictions on the method used for applying the scale adhesion prevention agent to the internal walls of the polymerization vessel, and suitable methods include brush application, spraying, steam application, and filling the polymerization vessel with the scale adhesion prevention agent and then extracting the agent from the polymerization vessel.

Application of the scale adhesion prevention agent in most modern vinyl chloride polymer production processes is conducted using steam as the application medium, and if this type of steam application is employed, then of the above scale adhesion prevention agents, self-condensation products of polyhydric phenols and polyhydric naphthols; condensation products of 1-naphthol and formaldehyde, and sulfide compounds of naphthols are preferred.

[Other Optional Components]

In the process of the present invention, where necessary, other components typically used in the production of vinyl chloride polymers such as polymerization degree regulators, chain transfer agents, pH regulators, gelation enhancement agents, antistatic agents, cross linking agents, stabilizers and fillers may also be used. Furthermore, antioxidants may be added to the polymerization system prior to commencement of the polymerization, during the polymerization, or following completion of the polymerization, for purposes such as controlling the polymerization reaction or preventing deterioration of the product polymer.

[Other Conditions]

Other conditions associated with the polymerization, such as the method of supplying the aqueous medium, the vinyl chloride or the monomer mixture comprising vinyl chloride, and the dispersant and the like to the polymerization vessel, as well as the relative proportions added, may be similar to conventional processes.

EXAMPLES

As follows is a more detailed description of the present invention using a series of examples and comparative examples.

In the examples and the comparative examples described below, the apparatus shown in FIG. 1 was used. The polymerization vessel 1 was a vessel with a straight circular cylindrical body section.

In the electric wave liquid level gauge 10 used in the examples and comparative examples, the diameter of the waveguide was 40 mm, and the diameter of the opening at the tip of the horn antenna was 241 mm.

In FIG. 1, the horizontal plane that marks the top edge of the straight circular cylindrical body section of the polymerization vessel 1 is labeled as the "TL line". A horizontal plane that sits 0.5 m higher than the TL line is labeled as the "B line", and the position of the bottommost point of the polymerization vessel is labeled the "A line". The height at the line A was deemed to be 0%, and the height from the line A to the line B was set as 100%. The electric wave liquid level gauge 10 was installed so that the surface of the opening at the tip of the horn antenna coincided with the horizontal plane labeled as the B line.

Example 1

The polymerization vessel for conducting the vinyl chloride suspension polymerization was a polymerization vessel 1 with an internal capacity of 130 m$^3$, which had been coated in advance with a scale adhesion prevention agent to form a scale adhesion prevention film on the internal surface, and was fitted with a reflux condenser 5. This polymerization vessel 1 was charged with 54,900 kg of ion exchange water, 13.8 kg of partially saponified polyvinyl alcohol, and 9.2 kg of hydroxypropylmethyl cellulose. Using an electric wave liquid level gauge 10 which radiated microwaves with a frequency of 5.8 GHz, confirmation was made that the liquid level at this point was consistent with the liquid quantity calculated in consideration of the difference in specific gravity depending on temperature. Subsequently, the inside of the polymerization vessel was evacuated with a vacuum pump until the internal pressure reached 7.98 kPa (gauge pressure), and 47,700 kg of vinyl chloride monomer was then added. At this point, the electric wave liquid level gauge 10 was once again used to confirm that the liquid level was consistent with the total liquid quantity calculated from the flow rates displayed on the flow rate meters. Subsequently, with the mixture undergoing constant stirring, 25.3 kg of di-2-ethylhexyl peroxydicarbonate was forced into the polymerization vessel as a polymerization initiator.

At the commencement of the polymerization, the stirring force per unit weight (t) of the contents in the polymerization vessel was $1.3 \times 10^3$ W (130 kg·m/s). Furthermore, the stirring rotational speed from the point at which stirring was started through until the extraction of the slurry described below was maintained at 86 rpm. Next, hot water was circulated through the heating and cooling jacket to raise the temperature of the liquid phase inside the polymerization vessel to 53° C., and once this temperature was reached, the polymerization reaction was allowed to proceed with the temperature maintained at 53° C. When the internal pressure of the polymerization vessel reached 588 kPa (gauge pressure), the polymerization was stopped, the unreacted monomer was recovered, the product polymer slurry was extracted from the polymerization vessel, and the polymerization vessel was washed. The liquid level of the polymerization vessel contents was able to be measured during both the polymerization step and the steps outside the polymerization step (such as recovering the unreacted monomer and washing the vessel).

Example 2

With the exception of replacing the electric wave liquid level gauge with a frequency of 5.8 GHz described in the example 1 with an electric wave liquid level gauge with a frequency of 6.0 GHz, polymerization, extraction and washing were performed in the same manner as the example 1. The liquid level of the polymerization vessel contents was able to be measured during both the polymerization step and the steps outside the polymerization step.

Comparative Example 1

With the exception of replacing the electric wave liquid level gauge with a frequency of 5.8 GHz described in the example 1 with an electric wave liquid level gauge with a frequency of 3 GHz, polymerization was performed in the same manner as the example 1. During the addition of the vinyl chloride monomer, as the liquid level inside the polymerization vessel was rising, the quantity of noise (reflected waves from the internal walls of the polymerization vessel) received by the level gauge was considerable, and the reflected waves (signal) from the liquid level, which represent the measurement target, became mixed with that noise, making detection of the liquid level difficult.

Comparative Example 2

With the exception of replacing the electric wave liquid level gauge with a frequency of 5.8 GHz described in the example 1 with an electric wave liquid level gauge with a frequency of 26 GHz, polymerization was performed in the same manner as the example 1. During the operation of the reflux condenser 5, the microwaves underwent irregular reflection off the surface of the foam phase generated inside the polymerization vessel, and as a result, the intensity of the received signal fell significantly, making detection of the liquid level difficult.

The frequencies of the microwaves emitted by the electric wave liquid level gauges used in each of the examples and comparative examples, and the reasons that liquid level detection was impossible in each of the comparative examples are summarized in Table 1.

TABLE 1

|  | Frequency (GHz) | Main reason for inability to detect liquid level |
|---|---|---|
| Example 1 | 5.8 | (measurement possible during all steps) |
| Example 2 | 6.0 | (measurement possible during all steps) |
| Comparative example 1 | 3.0 | Increase in reflected waves (noise) from the internal walls of the polymerization vessel |
| Comparative example 2 | 26.0 | Irregular reflection of microwaves off the foam phase during operation of the reflux condenser |

Example 3

The polymerization vessel 1 of internal capacity 130 m$^3$ with an attached reflux condenser was used. Furthermore, an electric wave liquid level gauge which radiated microwaves with a frequency of 5.8 GHz was used as the electric wave liquid level gauge 10. A condensation product of 1-naphthol and aldehyde (a scale adhesion prevention agent) was applied to the internal surfaces of the polymerization vessel and the inside of the reflux condenser, thus forming a scale adhesion prevention film. The polymerization vessel was then charged with 54,900 kg of ion exchange water, 13.8 kg of partially saponified polyvinyl alcohol, and 9.2 kg of hydroxypropylmethyl cellulose. Using the electric wave liquid level gauge 10, confirmation was made that the liquid level at this point was consistent with the liquid quantity calculated in consideration of the difference in specific gravity depending on temperature. Subsequently, the inside of the polymerization vessel was evacuated with a vacuum pump until the internal pressure reached 7.98 kPa (gauge pressure), and 47,700 kg of vinyl chloride monomer was then added. At this point, the electric wave liquid level gauge 10 was once again used to confirm that the liquid level was consistent with the total liquid quantity calculated from the flow rates displayed on the flow rate meters. Subsequently, with the mixture undergoing constant stirring, 25.3 kg of di-2-ethylhexyl peroxydicarbonate was forced into the polymerization vessel as a polymerization initiator.

At the commencement of the polymerization, the stirring force per unit weight (t) of the contents in the polymerization vessel was $1.3 \times 10^3$ W (130 kg·m/s). Furthermore, the stirring rotational speed from the point at which stirring was started through until the extraction of the slurry described below was maintained at 86 rpm.

Subsequently, hot water was circulated through the heating and cooling jacket to raise the temperature of the liquid phase inside the polymerization vessel to 53° C., and once this temperature was reached, the polymerization reaction was allowed to proceed with the temperature maintained at 53° C., the water circulating through the heating and cooling jacket was replaced with cooling water, and 30 minutes after commencement of the polymerization, cooling water was also circulated through the reflux condenser to start heat removal. The proportion of the heat removal performed by the reflux condenser was gradually increased, while the level of the foam phase was monitored with the electric wave liquid level gauge 10. The quantity of cooling water circulating through the reflux condenser was controlled so that the level of the foam phase was always at least 5 cm below the opening at the tip of the horn antenna. When the internal pressure of the polymerization vessel reached 588 kPa (gauge pressure), the polymerization was stopped, the unreacted monomer was recovered, and extraction of the product polymer slurry from the polymerization vessel was started. Coinciding with the start of this extraction step, the rotational speed of the stirrer was reduced to 46 rpm, and when the reading from the electric wave liquid level gauge 10 indicated that the liquid level had fallen to 10.0% (as shown in FIG. 1, the height from the line A to the line B was set as 100%) of the preset height, washing of the polymerization vessel was commenced, and this washing process was continued for 11 minutes.

Following completion of the steps described above, the state of scale adhesion to the inside of the polymerization vessel and the state of the horn antenna were inspected. Furthermore, the polymer was dewatered, dried and evaluated for quality. The various evaluation methods used are described below.

[Evaluation Methods]

State of Scale Adhesion

The state of scale adhesion to the inside of the polymerization vessel was inspected, and evaluated according to the following criteria.

A: Almost no scale adhesion detected.

B: Scale adhesion around the periphery of the polymerization vessel in the vicinity of the gas-liquid interface.

C: Scale adhesion not only near the gas-liquid interface, but also on the top of the cooling baffle.

Bulk Specific Gravity

The bulk specific gravity of the product polymer was measured in accordance with JIS K-6721.

Measurement of the Particle Size Distribution

The particle size distribution of the product polymer was measured in accordance with the particle size distribution measurement method of JIS Z-8801, and the weight % values of the sample which passed through a #60, #100 and #200 sieve respectively were determined.

Quantity of Fish Eyes 100 parts by weight of the product polymer, 50 parts by weight of DOP, 0.1 parts by weight of barium stearate, 0.1 parts by weight of cadmium stearate, 0.8 parts by weight of cetanol, 2.0 parts by weight of a tin based stabilizer, 0.5 parts by weight of titanium dioxide, and 0.1 parts by weight of carbon black were kneaded together for 5 minutes at 140° C. using a six inch roller, and a sheet of thickness 0.3 mm was formed from the mixture. The number of white transparent spots per 100 cm$^2$ of the sheet was counted and recorded as the fish eye quantity.

Example 4

With the exception of commencing washing of the polymerization vessel when the liquid level had fallen to 12.1% of the preset height (described above), polymerization and washing were conducted in the same manner as the example 3, and evaluations were then also conducted in the same manner as the example 3.

Comparative Example 3

With the exception of not using a liquid level gauge, and controlling the liquid level by conventional methods relying on flow rate meter values or the like, a polymerization was conducted in the same manner as the example 3. Coinciding with the start of the extraction of the polymer slurry from the polymerization vessel, the rotational speed of the stirrer was reduced to 46 rpm, and in a similar manner to conventional methods, when the load on the stirrer fell as a result of the liquid level falling below a certain level, the stirrer was stopped, and washing of the polymerization vessel was then conducted for 11 minutes. The liquid level at the commencement of washing in this example was 5% of the aforementioned preset height (described above). Evaluations were then conducted in the same manner as the example 3.

Comparative Example 4

With the exception of reducing the polymerization vessel washing time to 9 minutes, polymerization and washing were conducted in the same manner as the comparative example 3, and evaluations were then conducted in the same manner as the example 3. The evaluation results are shown in Tables 2 and 3.

Comparative Example 5

With the exception of increasing the quantity of the vinyl chloride monomer described in the example 3 by 1.5 weight %, polymerization and washing were conducted in the same manner as the comparative example 3, and evaluations were then conducted in the same manner as the example 3.

Comparative Example 6

With the exception of reducing the quantity of the vinyl chloride monomer described in the example 3 by 1.5 weight %, polymerization and washing were conducted in the same manner as the comparative example 3, and evaluations were then conducted in the same manner as the example 3.

[Evaluation Results]

For the example 3, the example 4, the comparative example 3 and the comparative example 4, the height of the liquid level at the commencement of washing, the washing time, and the time required from the commencement of slurry extraction until the completion of the washing process are shown in Table 2.

Furthermore, for the example 3, the example 4, the comparative example 3 and the comparative example 4, the results of the aforementioned evaluations of the bulk specific gravity, the #60 pass %, the #100 pass % and the #200 pass % for the polymer, the number of fish eyes, and the level of scale adhesion are shown in Table 3. Furthermore, in the case of the comparative example 5 and the comparative example 6, the results from the same evaluations, together with the degree of excess or degree of deficiency in the quantity of the vinyl chloride monomer are also shown in Table 3.

In each of the examples and comparative examples described above, inspection of the inside of the polymerization vessel revealed absolutely no adhesion to the horn antenna of the liquid level gauge.

TABLE 2

|  | Liquid level height at commencement of washing (%) | Washing time (minutes) | Time from commencement of slurry extraction until completion of washing (minutes) |
|---|---|---|---|
| Example 3 | 10.0 | 11 | 26.5 |
| Example 4 | 12.1 | 11 | 25 |
| Comparative example 3 | 5.0 | 11 | 31.5 |
| Comparative example 4 | 5.0 | 9 | 29.5 |

TABLE 3

|  | Monomer excess - deficiency (± weight %) | Bulk specific gravity (g/ml) | Particle size #60 pass (%) | Particle size #100 pass (%) | Particle size #200 pass (%) | Fish eyes (number) | State of scale adhesion |
|---|---|---|---|---|---|---|---|
| Example 3 | 0 | 0.521 | 100 | 56.7 | 0.9 | 2 | A |
| Example 4 | 0 | 0.525 | 100 | 53.4 | 0.9 | 2 | A |
| Comparative example 3 | 0 | 0.523 | 100 | 58.1 | 0.8 | 1 | A |
| Comparative example 4 | 0 | 0.521 | 100 | 55.1 | 0.9 | 10 | A |
| Comparative example 5 | +1.5 | 0.515 | 99.8 | 63.2 | 1.2 | 12 | B |
| Comparative example 6 | −1.5 | 0.518 | 99.9 | 50.1 | 1.6 | 23 | C |

Examples 5 to 7

In the examples 5 to 7, the polymerization vessel 1 of internal capacity 130 m³ with an attached reflux condenser was used. A scale adhesion prevention film was formed in advance on the internal walls of the polymerization vessel 1 by application of a scale adhesion prevention agent. An electric wave liquid level gauge, which was equipped with a horn antenna and radiated microwaves with a frequency of 5.8 GHz, was used as the electric wave liquid level gauge 10. This electric wave liquid level gauge 10 was connected to a computer (not shown in the figures) and the detection signals from the electric wave liquid level gauge were input into this computer. The computer was programmed to add an antifoaming agent via the antifoaming agent addition line 17 when the received signal met certain conditions described below.

The polymerization conversion rate at any specific point during a polymerization conducted in any of the examples or comparative examples was determined by actually conducting the polymerization under the specified conditions, adding an antioxidant to the polymerization time at a specific time to halt the polymerization, measuring the quantity of polymer produced at that point, and then using this measured quantity to calculate the polymerization conversion rate at that point. A plurality of polymerization reactions are conducted under the same conditions, with the time until the polymerization is halted extended by 0.5 hours in each successive reaction, and the polymerization conversion rate is measured in each case. This method was used to establish, in advance, the relationship between reaction time and polymerization conversion rate for each of the specific reaction conditions, and certain times and polymerization conversion rates could then be specified on the basis of these relationships.

Example 5

The computer described above was programmed to automatically add the antifoaming agent to the reaction mixture when the electric wave liquid level gauge 10 detected that the liquid level had reached a height equivalent to a point 0.3 m vertically below the line B described above. Monitoring of the liquid level by the electric wave liquid level gauge 10 was conducted throughout all of the process steps, from prior to the addition of the polymerization mixture, and through the steps for adding the reactants, conducting the polymerization, extracting the polymer slurry following completion of the polymerization, washing the polymerization vessel, and any subsequent steps, and the results of this monitoring were displayed continuously on a display or the like. The polymerization vessel 1 was charged with 54,900 kg of ion exchange water, 13.8 kg of partially saponified polyvinyl alcohol, and 9.2 kg of hydroxypropylmethyl cellulose. Subsequently, the inside of the polymerization vessel was evacuated with a vacuum pump until the internal pressure reached 7.98 kPa (gauge pressure), and 47,700 kg of vinyl chloride monomer was then added. With the mixture undergoing constant stirring, 25.3 kg of di-2-ethylhexyl peroxydicarbonate was then forced into the polymerization vessel as a polymerization initiator. Subsequently, hot water was circulated through the heating and cooling jacket to raise the temperature of the liquid phase inside the polymerization vessel to 53° C. The polymerization reaction was then allowed to proceed with the temperature maintained at this temperature. Heat removal using the reflux condenser was commenced when the polymerization conversion rate reached 15%, and the quantity of heat removed by the reflux condenser was increased until it reached 8370 MJ/hr at the point where the polymerization conversion rate had reached 40%. This heat removal quantity was then maintained while the reaction proceeded. In accordance with the computer program described above, when the liquid level exceeded the aforementioned height, an antifoaming agent comprising 120 kg of a 2% aqueous solution of a copolymer polyether, with a weight average molecular weight of 1,500,00 and comprising a 80/20 molar ratio of ethylene oxide and propylene oxide, was added continuously to the reaction mixture over a two minute period. At this point, the polymerization conversion rate had reached 50%. When the internal pressure of the polymerization vessel reached 588 kPa (gauge pressure), the polymerization was stopped by the addition of 5.0 g of triethylene glycol-bis[3-(3-t-butyl-5-methyl-4-hydroxyphenyl)propionate] as a polymerization inhibitor, and the unreacted monomer was recovered. The product polymer slurry was then extracted from the polymerization vessel, and the polymerization vessel was washed. Heat removal using the reflux condenser was stopped when the polymerization conversion rate had reached 80%.

At the commencement of the polymerization, the stirring force per unit weight (t) of the contents in the polymerization vessel was $1.3 \times 10^3$ W (130 kg·m/s). Furthermore, the stirring rotational speed from the point at which stirring was started through until the extraction of the slurry was maintained at 86 rpm. The proportion of heat removed by the reflux condenser relative to the total heat removal quantity per unit of time reached its maximum value of 55% at a polymerization conversion rate of 75%.

Example 6

With the exceptions of increasing the quantity of heat removed by the reflux condenser so that it reached 8370 MJ/hr at the point where the polymerization conversion rate had reached 25%, and the fact that the polymerization conversion rate was 30% when the antifoaming agent was added, polymerization, extraction and washing were conducted in the same manner as the example 5.

Example 7

With the exceptions of using 35.3 kg of di-2-ethylhexyl peroxydicarbonate as the polymerization initiator, and increasing the quantity of heat removed by the reflux condenser so that it reached 12,600 MJ/hr at the point where the polymerization conversion rate had reached 40%, polymerization, extraction and washing were conducted in the same manner as the example 5.

[Evaluation Results]

For the polymers produced in each of the above examples and comparative examples, the bulk specific gravity, the particle size distribution (#60 pass %, #100 pass % and #200 pass %), the number of fish eyes, and the level of scale adhesion to the inside of the polymerization vessel following the polymerization reaction were evaluated. The results are shown in Table 4.

Furthermore according to the present invention, by detecting and measuring the liquid level using a polymerization vessel equipped with a liquid level gauge, the quantity of heat removed by the reflux condenser during the polymerization reaction step can be increased, and the process time, including the time required for the raw material addition step and/or the washing step performed at the completion of the polymerization reaction, can be shortened. In addition, both overfilling and underfilling during the monomer addition step can be essentially prevented from occurring, the generation of scale can be suppressed, stability in the quality of the product can be maintained, and the productivity can be improved.

In addition, according to the present invention, by using an electric wave liquid level gauge that radiates microwaves with a frequency of 4 to 20 GHz to monitor the liquid level of the polymerization vessel contents during use of the reflux condenser, and then adding an antifoaming agent to the contents to suppress foaming when the liquid level rises, the heat removal capability of the reflux condenser can be utilized to maximum effect. Specifically, whereas the proportion of heat removed by the reflux condenser relative to the total heat removal quantity required is within a range from 15 to 25% in those cases where an antifoaming agent is not added, in those cases where an antifoaming agent is added in accordance with the present invention, that proportion can be increased to 30% or more (30 to 60%). Thus in a process of the present invention, by monitoring the liquid level and adding an antifoaming agent as required, the quantity of heat removed by the reflux condenser can be increased enormously. Because the process of the present invention enables the quantity of heat removed by the reflux condenser to be increased in the latter stages of the polymerization reaction when the reaction heat reaches its peak, the polymerization time can be shortened, energy can be conserved, and productivity can be improved.

In a process according to the present invention, foaming during the polymerization reaction can be suppressed by addition of an antifoaming agent, and consequently eruptions of foam and polymer particles up inside the reflux condenser, resulting in surface adhesion and the generation of scale, can be effectively prevented. Furthermore, because the electric wave liquid level gauge used in the present invention is separated from the liquid level, adhesion of

TABLE 4

|  | Bulk specific gravity (g/ml) | Particle size #60 pass (%) | Particle size #100 pass (%) | Particle size #200 pass (%) | Fish eyes (number) | State of scale adhesion | Polymerization time (hours) |
| --- | --- | --- | --- | --- | --- | --- | --- |
| Example 5 | 0.525 | 100 | 55.1 | 0.8 | 2 | A | 5.3 |
| Example 6 | 0.524 | 100 | 56.1 | 1.0 | 2 | A | 5.3 |
| Example 7 | 0.522 | 100 | 54.0 | 1.0 | 3 | A | 4.2 |

According to the present invention, by using a polymerization vessel equipped with an electric wave liquid level gauge that radiates microwaves with a frequency of 4 to 20 GHz, the liquid level of the polymerization vessel contents can be detected and measured not only during the polymerization reaction step, but also during all the other steps outside of the polymerization reaction, and consequently the state inside the polymerization vessel can be accurately ascertained at all times.

foam or scale to the sensor section of the gauge can be effectively suppressed. As a result, measurement accuracy can be maintained during monitoring of the liquid level, and the electric wave liquid level gauge can be used for extended periods with minimal maintenance. In addition, provided foam and scale cannot adhere to the sensor section, the sensor of the electric wave liquid level gauge can be positioned in the most suitable location inside the polymerization vessel.

What is claimed is:

1. A production process for a vinyl chloride polymer in which either vinyl chloride, or a mixture of vinyl chloride and another copolymerizable monomer, is polymerized in an aqueous medium inside a polymerization vessel equipped with a reflux condenser to generate a vinyl chloride polymer, wherein a liquid level of contents inside said polymerization vessel is detected using an electric wave liquid level gauge, which is disposed on said polymerization vessel and radiates microwaves of 4 to 20 GHz.

2. The production process according to claim 1, wherein said liquid level of said contents inside said polymerization vessel is detected during all steps, including steps prior to said polymerization, said polymerization step, and steps following said polymerization.

3. The production process according to claim 1, wherein said electric wave liquid level gauge comprises a sensor and a horn antenna that is mounted to a tip of said sensor.

4. The production process according to claim 1, wherein said electric wave liquid level gauge is used for detecting and measuring said liquid level of said contents inside said polymerization vessel during a polymerization reaction step, and also during a raw material addition step performed prior to commencement of said polymerization reaction, and/or polymer dispersion extraction and washing steps performed following completion of said polymerization reaction.

5. The production process according to claim 1, wherein at least for a period during which heat removal is conducted using said reflux condenser, said liquid level of said contents inside said polymerization vessel is monitored using said electric wave liquid level gauge, and when a polymerization conversion rate is within a range from 30 to 60% and said liquid level has risen above a predetermined height, an antifoaming agent is added to said contents.

6. The production process according to claim 5, wherein said antifoaming agent is an aqueous solution of a copolymer polyether with a weight average molecular weight within a range from 1,500,000 to 2,000,000, and an ethylene oxide to propylene oxide molar ratio within a range from 78/22 to 82/18.

7. The production process according to claim 6, wherein a quantity of said antifoaming agent added is within a range from 0.001 to 0.008 parts by mass in terms of said copolymer polyether per 100 parts by mass of said monomer or monomer mixture.

8. The production process according to claim 5, wherein addition of said antifoaming agent is conducted either intermittently or continuously.

* * * * *